3,352,911
HALOACETANILIDES
Stanley J. Strycker, Midland, Mich., assignor to The Dow Chemical Company, Midland, Mich., a corporation of Delaware
No Drawing. Filed June 8, 1964, Ser. No. 373,494
4 Claims. (Cl. 260—562)

ABSTRACT OF THE DISCLOSURE

This invention is concerned with the novel compounds 2,2,2 - trichloro - 2' - methoxy-4'-nitroacetanilide, 2,2-dichloro - 2' - hydroxy - 4' - nitroacetanilide and 2,2,2-trichloro - 2' - hydroxy - 4' - nitroacetanilide, which have been found useful as pesticides for the control of certain plant, insect, fungal and bacterial pests.

---

The present invention is directed to a new group of nitroacetanilide compounds having the formula

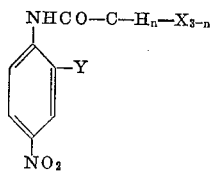

In the present specification and claims, X represents halo, Y represents hydroxy or methoxy and $n$ represents one of the integers 0 and 1. Halo as employed in the present specification and claims represents bromine, chlorine or fluorine. The compounds of the present invention are solid materials which are of low solubility in water and somewhat soluble in a number of organic solvents. The compounds of the present invention have been found to be useful as pesticides for the control of a number of plant, insect, fungal and bacterial pests such as Japanese millet, Staphylococcus aureus, Aspergillus terreus, tomato late blight, and salvinia.

The compounds of the present invention are prepared by reacting a substituted nitroaniline compound corresponding to the formula

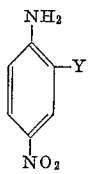

with a haloacetyl halide having the formula $$X—CO—C—H_n—X_{3-n}$$

or a haloacetyl anhydride having the formula $$(C—H_n—X_{3-n}—CO)_2O$$

The reaction is carried out in the presence of an organic liquid as reaction medium. The proportions of the reactants to be employed are not critical, some of the desired product being formed immediately upon contacting the reactants in any proportions. However, when optimum yields are desired, the substituted nitroaniline compound is preferably employed in substantially equimolar proportions with either the haloacetyl halide or the haloacetyl anhydride. Regardless of whether haloacetyl halide or haloacetyl anhydride is employed, the reaction proceeds readily at temperatures between 35 and 180° C. Hydrogen halide is formed and evolved as a reaction by-product when a haloacetyl halide is employed as a starting material. The employment of a haloacetyl anhydride as a starting material results in the formation of a haloacetic acid in addition to the desired product.

In carrying out the preparation of the compounds, the reactants are contacted together in any order in the presence of an organic liquid as reaction medium. Representative haloacetyl halides and haloacetyl anhydrides include 2,2 - dibromoacetyl bromide, 2,2-difluoroacetyl chloride, 2,2,2 - trifluoroacetyl anhydride, 2,2,2 - trifluoroacetyl fluoride, 2,2 - difluoroacetyl fluoride, 2,2,2-tribromoacetyl anhydride, 2,2,2 - trifluoroacetyl bromide, and 2,2,2 - trichloroacetyl anhydride. Representative organic liquids to be employed as liquid reaction mediums include benzene, carbon tetrachloride, methylene chloride, o-dichlorobenzene, chloroform, toluene, cyclohexane, ligroin and diethyl ether. Following the contacting of the reactants, the reaction mixture is maintained at the reaction temperature for a short period of time or until there is a substantial cessation in the production and evolution of hydrogen halide or until there is a substantial cessation in the production of haloacetic acid. The desired product can be separated from the reaction medium by such conventional procedures as cooling the reaction mixture to induce crystallization and separating the crystals by such procedures as filtration or decantation. In an alternative operation, the reaction mixture can be concentrated by evaporation of reaction medium under reduced pressure leaving the product as a residue. The crystals or residue thus obtained can be employed in pesticidal applications or further purified by such common procedures as washing and recrystallization.

The following examples are merely illustrative and are not intended to be limiting.

*Example 1.—2,2,2-trichloro-2'-hydroxy-4'-nitroacetanilide*

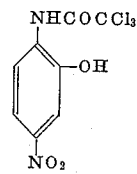

2-hydroxy-4-nitroaniline (15.4 grams; 0.10 mole) was dispersed in 300 milliliters of benzene. To this dispersion was added with stirring the trichloroacetyl chloride (20.0 grams; 0.11 mole) and the resulting mixture heated with stirring at the boiling temperature and under reflux until there was substantial cessation in the evolution of hydrogen chloride. Following the heating period, the reaction mixture was allowed to cool to room temperature. Thereafter, the reaction medium was evaporated in vacuo leaving the 2,2,2 - trichloro - 2' - hydroxy - 4' - nitroaniline product as a solid residue. This product was then dissolved is iso-propanol and the iso-propanol solution diluted with ice water. During the dilution, the product separated as a crystalline solid, and the solid was thereafter recrystallized from aqueous ethanol. The recrystallized product melted at 210–211° C.

*Example 2.—2,2-dichloro-2'-methoxy-4'-nitroacetanilide*

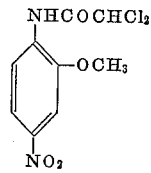

Dichloroacetyl chloride (16.2 grams; 0.11 mole) and 2 - methoxy-4-nitroaniline (16.8 grams; 0.10 mole) were dispersed in 250 milliliters of carbon tetrachloride. The resulting mixture was heated with stirring at the boiling temperature and under reflux for three hours. Toward the end of the heating period there was substantial cessation in the evolution of hydrogen chloride. Thereafter, the reaction mixture was cooled in an ice bath, whereupon, the 2,2 - dichloro - 2' - methoxy-4-nitroanilide product crystallized. The crystals were separated from the reaction mixture by filtration and recrystallized from cyclohexane. The recrystallized product melted at 88–89° C.

In a similar manner, the following compounds of the present invention are prepared.

2,2 - dibromo - 2' - methoxy - 4' - nitroanilide (molecular weight 366.8) by reacting together 2 - methoxy-4-nitroaniline and dibromoacetyl bromide.

2,2,2 - tribromo - 2' - hydroxy - 4' - nitroanilide (molecular weight 432.7) by reacting together 2-hydroxy-4-nitroaniline and tribromoacetyl bromide.

2,2,2 - trichloro - 2' - methoxy - 4' - nitroacetanilide (melting point 107–108° C.) by reacting 2 - methoxy-4-nitroaniline and trichloroacetyl chloride.

2,2,2 - tribromo - 2' - methoxy - 4' - nitroanilide (molecular weight 446.7) by reacting 2 - methoxy - 4 - nitroaniline and tribromoacetyl bromide.

2,2 - dibromo - 2' - hydroxy - 4' - nitroanilide (molecular weight 352.8) by reacting 2 - hydroxy - 4 - nitroaniline and dibromoacetyl bromide.

2,2 - dichloro - 2' - hydroxy - 4' - nitroanilide (melting point 164–164.5° C.) by reacting 2 - hydroxy-4-nitroaniline and dichloroacetyl chloride.

2,2,2 - trifluoro - 2' - methoxy - 4' - nitroacetanilide (molecular weight 264) by reacting together 2-methoxy-4 - nitroaniline and 2,2,2 - trifluoroacetyl chloride.

2,2 - difluoro - 2' - hydroxy - 4' nitroacetanilide (molecular weight 231) by reacting together 2 - hydroxy-4-nitroaniline and 2,2-difluoroacetyl anhydride.

The compounds of the present invention are useful as pesticides for the control of various pests such as insects, bacteria, fungi and terrestrial and water plants. For such uses, the unmodified compound can be employed or the compound can be dispersed on an inert finely divided solid such as talc, chalk or bentonite and employed as a dust. Also, such mixtures can be dispersed in water, with or without the aid of a surface active dispersing agent, and the resulting aqueous suspension employed as sprays, drenches or washes. In other procedures, the products can be employed as the toxic constituent in solvent solutions, oil-in-water and water-in-oil emulsions or aqueous dispersions.

In representative operations, aqueous compositions containing 2,2,2 - trichloro - 2' - methoxy - 4' - nitroacetanilide at a concentration of 10 parts per million by weight gave complete kills of cabomba, moneywort, salvinia and milfoil. In other operations, aqueous compositions containing 2,2 - dichloro - 2' - hydroxy-4'-nitroanilide at concentrations of 100 parts per million by weight give complete kills of *Verticillium alboatrum* and *Cercosphora beticola*.

The haloacetyl halides employed as starting materials as herein described can be prepared by the halogenation of acetic acid with $PCl_5$ or $PBr_5$. The reaction is carried out at a temperature from 100 to 150° C. The desired product is separated from the reaction mixture by fractional distillation. The fluoroacetyl halides are prepared by reacting the chloro- or bromoacetyl halides with a fluoride compound which will effect the exchange of fluorine for chlorine or bromine, such as $ZnF_2$ or HF. The haloacetyl anhydrides can be prepared by reacting together haloacetic acid and the corresponding haloacetyl halide in the presence of triethylamine and an inert solvent such as benzene. The desired product is separated by conventional procedures.

I claim:
1. A compound selected from the group consisting of 2,2,2 - trichloro - 2' - methoxy - 4' - nitroacetanilide, 2,2-dichloro - 2' - hydroxy - 4' - nitroacetanilide and 2,2,2-trichloro-2'-hydroxy-4'-nitroacetanilide.
2. 2,2,2-trichloro-2'-methoxy-4'-nitroacetanilide.
3. 2,2-dichloro-2'-hydroxy-4'-nitroacetanilide.
4. 2,2,2-trichloro-2'-hydroxy-4'-nitroacetanilide.

References Cited

Nakamura et al., Arch. Biochem. Biophys., volume 66, pages 183–189.

Shimotani et al., Chem. Abst., volume 55, column 12324 (1961).

Votocek et al., Chem. Abst., volume 9, page 2380 (1915).

WALTER A. MODANCE, *Primary Examiner.*

JOHN D. RANDOLPH, *Examiner.*

N. TROUSOF, *Assistant Examiner.*